J. H. CRUMB.
FEEDING DEVICE FOR THRESHING MACHINES.
APPLICATION FILED JAN. 19, 1918.
1,299,684.
Patented Apr. 8, 1919.
2 SHEETS—SHEET 1.
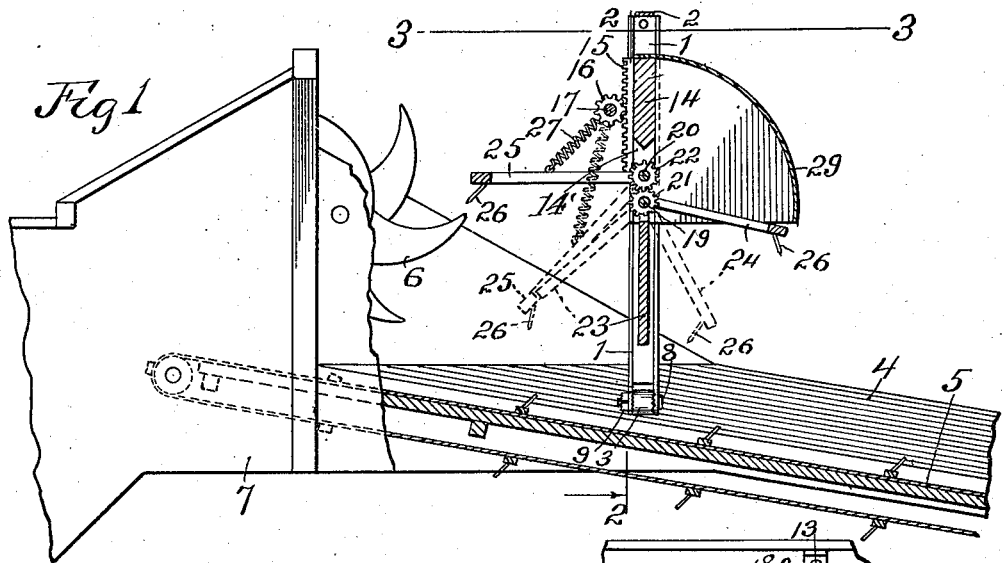
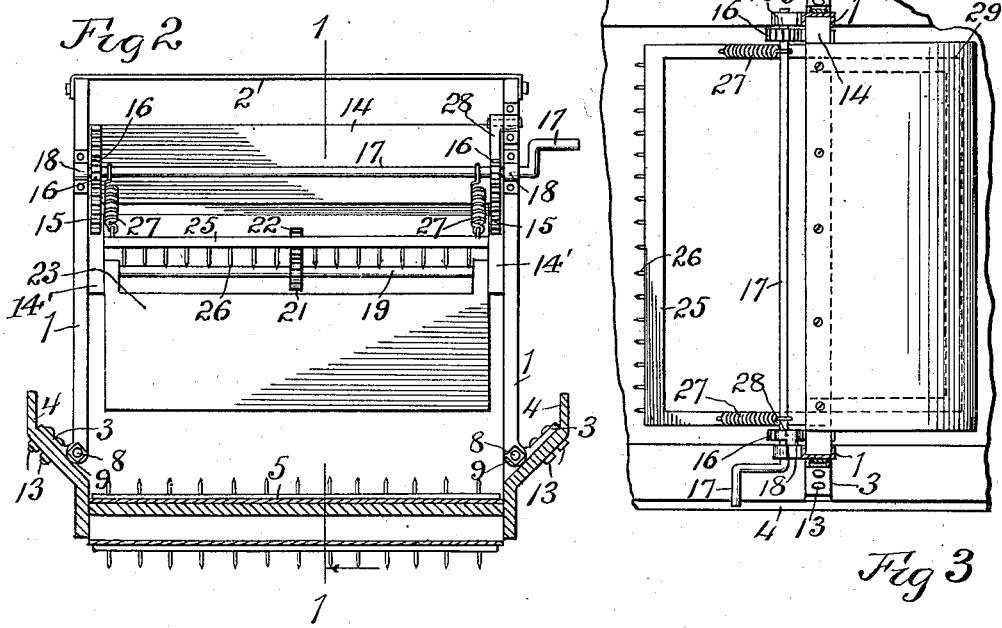
WITNESS:
INVENTOR.
John H. Crumb
BY Warren D. House
His ATTORNEY J. H. CRUMB.
FEEDING DEVICE FOR THRESHING MACHINES.
APPLICATION FILED JAN. 19, 1918.
1,299,684.
Patented Apr. 8, 1919.
2 SHEETS—SHEET 2.
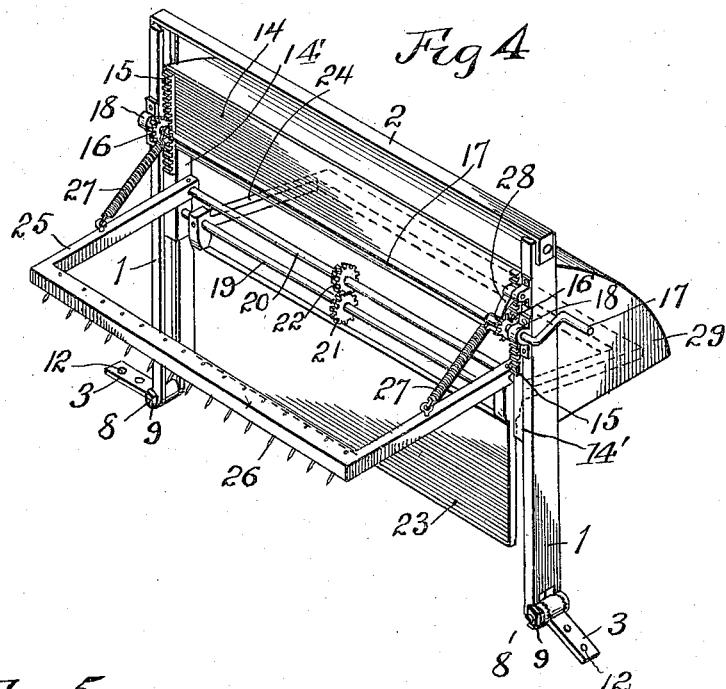
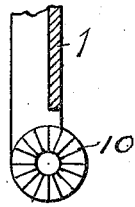
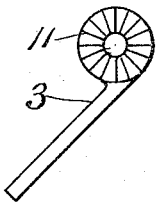
WITNESS:
RE Hamilton
INVENTOR.
John H. Crumb,
BY Warren D. House,
His ATTORNEY

UNITED STATES PATENT OFFICE.

JOHN H. CRUMB, OF LAWRENCE, KANSAS.

FEEDING DEVICE FOR THRESHING-MACHINES.

1,299,684.  Specification of Letters Patent.  Patented Apr. 8, 1919.

Application filed January 19, 1918. Serial No. 212,575.

*To all whom it may concern:*

Be it known that I, JOHN H. CRUMB, a citizen of the United States, residing at Lawrence, in the county of Douglas and State of Kansas, have invented a certain new and useful Improvement in Feeding Devices for Threshing-Machines, of which the following is a specification.

My invention relates to improvements in feeding devices for threshing machines.

It relates particularly to feed regulators for threshing machines.

One of the objects of my invention is to provide a feed regulator which is adapted to be attached to the trough of a grain feeder or bundle carrier, which will automatically temporarily restrain and hold back the feeding of surplus grain or bundles, so as to make the feeding of the grain uniform and to avoid liability of choking down the machine.

A further object of my invention is to provide a novel feed regulator, which may be easily and quickly adjusted so as to enable it to feed different amounts of grain.

Still another object of my invention is to provide a feed regulator which does not interfere with and is independent in operation from the regular feeding mechanism or other running parts of the machine.

My invention provides further a feed regulator which is simple in construction, economical to manufacture, which is durable and not liable to get out of order, and which is reliable in operation.

Other novel features of my invention are hereinafter fully described and claimed.

In the accompanying drawings which illustrate the preferred embodiment of my invention, Figure 1 is a vertical sectional view on the line 1—1 of Fig. 2, showing my improved feed regulator attached to the bundle carrier of an ordinary threshing machine, a portion of which is shown partly in side elevation and partly in vertical section.

Fig. 2 is a vertical sectional view on the line 2—2 of Fig. 1.

Fig. 3 is a horizontal sectional view on the line 3—3 of Fig. 1.

Fig. 4 is a perspective view of my improved feed regulator.

Fig. 5 is an enlarged vertical sectional view of the lower end of one of the supporting standards of the frame of the regulator.

Fig. 6 is a side elevation of one of the plates which support the frame.

Similar reference characters designate similar parts in the different views.

The feed regulator is provided with a vertical frame comprising two channel standards 1, the upper ends of which are rigidly secured to a transverse bar 2.

3 designates two plates, one of which is shown in Fig. 6, which are adapted to be respectively secured to the opposite inner walls of the trough 4 of an ordinary bundle carrier or grain feeder, which is provided with the usual conveyer belt 5, which carries the grain upwardly to the rotary band cutter 6, which is rotatably mounted in the usual manner at the forward end of the body 7 of the thresher machine.

The lower ends of the standards 1 are bifurcated and have secured between the arms of said bifurcations the supporting plates 3. Respectively extending through the plates 3 and the adjacent arms of the members 1 are two bolts 8 provided with nuts 9, by means of which the bifurcated ends of the standards 1 may be securely clamped to the plates 3. In order that the plates 3 may be held from turning in the standards 1, the inner sides of the arms of the latter may be provided with radial corrugations 10, Fig. 5, which are adapted to interlock with similar corrugations 11 provided at opposite sides of each of the plates 3. The plates 3 are provided each with bolt holes 12, through which extend bolts 13, mounted in the sides of the trough 4. Vertically slidable in the channels of the standards 1 is an inverted U-shaped support comprising a plate 14, having two depending arms 14¹, to which are secured, adjacent to its opposite ends respectively, two vertical racks 15, with which respectively mesh two pinions which are rigidly secured to a shaft 17, which is rotatably mounted in bearings 18, which are secured to the channel standards 1 respectively.

Two parallel transverse bars 19 and 20 are pivoted at their ends in the depending arms 14¹ of the support 14. Respectively rigidly secured to the bars 19 and 20 are two pinions 21 and 22, which mesh with each other.

Rigidly secured to the bar 19 is a transverse depending member 23, which is adapted to be disposed above the conveyer belt 5, in the trough 4, and which is adapted to be swung to the left, as viewed in Fig. 1 by surplus grain which is being carried upwardly in the trough 4 by the belt 5 toward the band cutters 6.

Respectively rigidly secured to the bars 19 and 20 are two U-shaped retarding or restraining devices 24 and 25, which are disposed at opposite sides of the frame 1, and the transverse portions of each of which are provided with downwardly extending teeth 26 which are adapted to engage and hold back surplus grain which strikes against and swings the member 23.

When the bundles of grain, or loose straw in passing up the chute 4 strike against the depending member 23, the latter will be swung to the left, as viewed in Fig. 1, thus swinging both of the restraining devices 24 and 25 downwardly, as for example to the position shown in dotted lines in Fig. 1, in which position, the teeth 26 will engage and hold the surplus bundle or straw from moving toward the band cutters 6. When the grain which is underneath the member 23, and which is below the surplus grain, has passed from under the surplus grain, the latter will fall upon the belt 5 and will be carried onwardly to the band cutters and into the machine in the usual manner.

For retracting the member 23 and the devices 24 and 25 to the position shown in solid lines in Figs. 1 and 4, there are provided two coil springs 27, one set of ends of which are secured to the device 25, and the other set of ends of which are fastened to the crank shaft 17.

By turning the crank shaft 17 in the proper directions, the support 14, together with the parts carried thereby, may be vertically adjusted to positions in which the member 23 will be at the proper distance above the belt 5 in order to accomplish the purpose desired. After the proper adjustment has been given to the support 14, it is held from moving downwardly by releasable means, which may comprise a pawl 28, Figs. 2 and 4, which is pivoted to one of the channel standards 1, and which is adapted to engage the adjacent pinion 16.

To prevent grain being thrown down upon the restraining device 24, a curved forwardly and downwardly extending shield 29 is secured to and movable with the support 14.

When the feed regulator is adjusted so as to permit grain to the depth of one bundle to pass under the member 23, if two bundles happen to be superposed one on the other, the upper bundle will strike the depending member 23 and will force it from the vertical position toward the position shown in dotted lines in Fig. 1, upon which the devices 24 and 25 will be swung downwardly by means of the bars 19 and 20 and pinions 21 and 22, causing the teeth 26 to engage the uppermost bundle, so as to hold it until the conveyer belt 5 has carried the lower bundle from beneath the upper bundle, upon which the latter will fall upon the belt 5 and out of engagement with the member 23 and devices 24 and 25, upon which the springs 27 will restore the parts to the normal position shown in solid lines in Figs. 1 and 4.

The members 3 being hinged to the channel standards 1 of the frame, may be swung to any angle to correspond with the angles of the sides of the trough 4 to which the feed regulator is to be attached.

When it is desired to elevate the member 23, the crank shaft 17 is turned counter-clockwise, as viewed in Figs. 3 and 4, thus causing the pinions 16 to lift the racks 15, thereby raising the support 14 together with the member 23 and restraining devices 24 and 25. To lower the member 23, the pawl 28 is disengaged from the adjacent pinion 16, after which the crank shaft 17 is turned in a clockwise direction, as viewed in Fig. 4.

I do not limit my invention to the structure shown and described, as modifications, within the scope of the appended claims, may be made without departing from the spirit of my invention.

What I claim is:—

1. A feed regulator for a threshing machine comprising a frame, a support slidable therein, a member movable in one direction by grain which is being fed into the machine and carried by said support, means for retracting said member, and means actuated by said member for engaging and temporarily restraining a portion of said grain.

2. A feed regulator for a threshing machine comprising a frame having means for attachment to a threshing machine, a support vertically adjustable on said frame, a depending member carried by said support and movable in one direction by grain which is being fed into the machine, two devices carried by said support and disposed at opposite sides of said frame and adapted when moved downwardly to engage and temporarily restrain the feeding of a portion of said grain, and means actuated by said member for simultaneously swinging said devices downwardly.

3. A feed regulator for a threshing machine consisting of a frame, a support adjustable thereon, a swinging depending member pivoted in said support, two swinging members at opposite sides of said depending member, and means connecting said depending member with said opposite swinging members for causing a downward movement of the latter as the depending member swings upwardly.

4. A feed regulator for a threshing machine consisting of a frame, a support adjustable thereon, a depending member pivoted in said support, a swinging member at one side of said depending member, and means connecting said members by which the swinging member is moved downwardly as the depending member swings upwardly.

In testimony whereof I have signed my name to this specification.

JOHN H. CRUMB.